(No Model.)
J. S. BROOKS.
SHEET METAL STOVE PIPE.
No. 330,770. Patented Nov. 17, 1885.
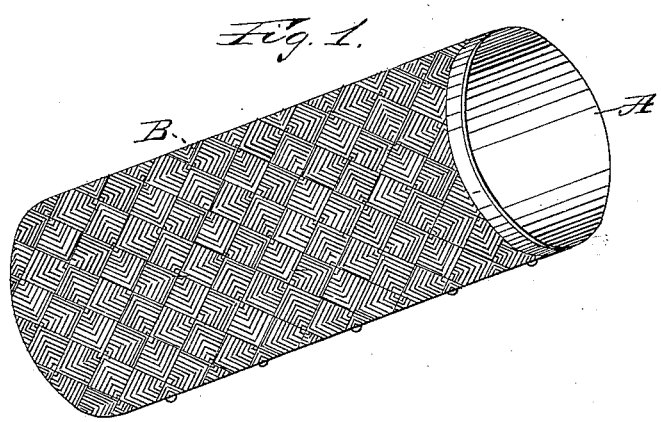
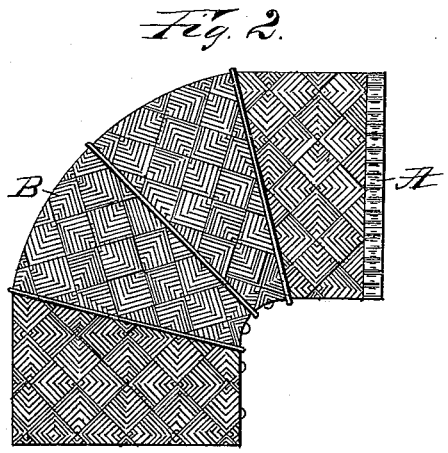
Witnesses.
John E. Elmendorf
Joseph J. Sullivan
Inventor.
John S. Brooks
by Frelinghuysen
Niscetty

United States Patent Office.

JOHN S. BROOKS, OF BROOKLYN, NEW YORK, ASSIGNOR TO FRANCES A. ESTABROOK, OF SAME PLACE, AND W. T. MERSEREAU & CO., OF NEW YORK, N. Y.

SHEET-METAL STOVE-PIPE.

SPECIFICATION forming part of Letters Patent No. 330,770, dated November 17, 1885.

Application filed May 27, 1884. Serial No. 132,984. (No model.)

*To all whom it may concern:*

Be it known that I, JOHN S. BROOKS, of the city of Brooklyn, county of Kings and State of New York, have invented a new and useful Improvement in Sheet-Metal Stove-Pipes, of which the following is such full, clear, and exact description, as will enable others skilled in the art to make and use the same, when taken in connection with the accompanying drawings, in which—

Figure 1 is a perspective view of a joint or section of pipe, and Fig. 2 is a face view of an elbow or curve.

A is the section of pipe, and B the embossed surface thereof, which may be made of the design shown, or in any suitable pattern.

I have generally made these stove-pipes by embossing the sheet metal before giving it a cylindrical form, and I then bend it into cylindrical shape and fasten the meeting edges in any appropriate manner, making a completed section of sheet-metal stove-pipe, which may be used and joined in the usual manner. The embossing may be omitted from the two edges which meet, and from the edge which forms one end of the sheet, so that the meeting edges will make a tight joint or seam, and that the sections may make a close fit with one another; but when the embossing covers the entire sheet, the seam may be made tight by rolling it or pressing it, and one end of the section may be crimped, so as to go into the next section.

The embossed surface adds to the appearance of the sheet-metal stove-pipe, and being rough and having projecting parts or protuberances upon it increases the radiation from the surface and makes an increase of heat over that produced when a smooth pipe is used from the same amount of fuel consumed.

The embossed surface gives to ordinary sheet-iron so improved an appearance that it will equal the finest Russian iron, which it has heretofore been necessary to use on good work.

The embossing increases the strength of the pipe to resist blows, and prevents dents made in the pipe from being so readily seen as they are when plain sheet metal is used.

Two joints or sections of the embossed sheet-metal stove-pipe will, when put together, make so close a joint that the joint or edge of the overlapping section will not be readily discerned among or distinguished from the various embossings on the surface of the pipe.

In making elbows of this metal it is preferred to emboss the surface before turning the elbow, as the surface is more readily covered with embossing before rather than after turning the elbow. The ribs raised about the pipe by the bending-machine add to the appearance of the embossed surface.

The section of pipe may be made of plain sheets and embossed by embossing rollers on a mandrel after it is completed.

The embossed surface of sheet-metal stove-pipes may be coated with enamel, polish, or other composition, which may be made of any desired color, which may vary and be adapted to the color of the room in which the stove-pipe is used, and may be applied so as to cover the entire surface, or only so much as is depressed, leaving the other parts exposed; or the raised parts may be coated and the depressed parts exposed. The addition of such a finish to the embossed surface adds greatly to the appearance of the pipe.

What I claim as new, and desire to secure by Letters Patent, is—

1. As a new article of manufacture, a stove-pipe section made of sheet metal embossed with any desired design, and coated and polished in any suitable manner, whereby increased strength and ornamental appearance are obtained, substantially as hereinbefore set forth.

2. As a new article of manufacture, a stove-pipe section made of sheet metal embossed with any desired design, and coated and polished in any suitable manner, the said embossing and polishing extending over the whole surface of the pipe, excepting only that part which enters the next section to form a joint.

JOHN S. BROOKS.

Witnesses:
JOSEPH J. SULLIVAN,
JOHN E. ELMENDORF.